Figure 1:
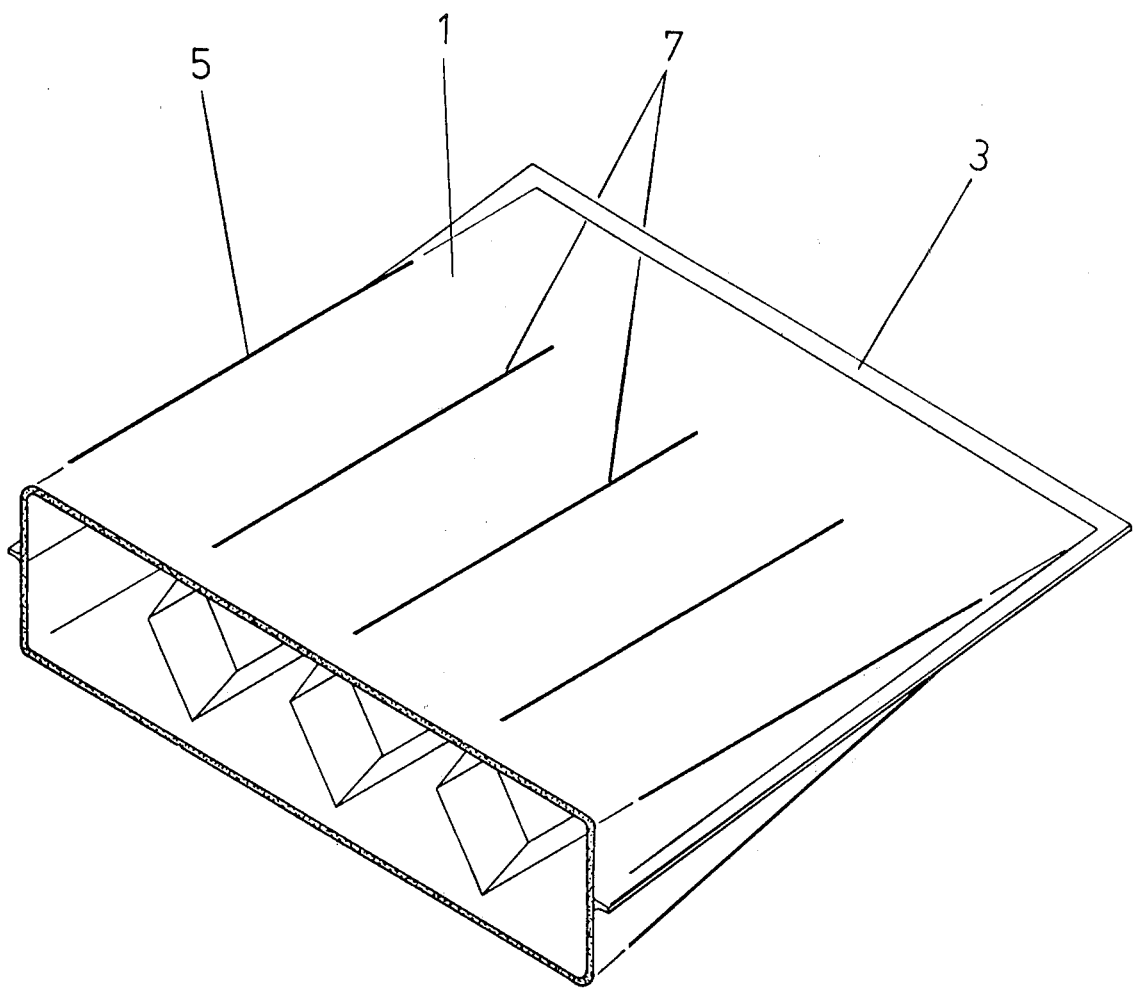

United States Patent [19]

Ringel et al.

[11] 4,056,375
[45] Nov. 1, 1977

[54] GAS FILTER ELEMENT

[75] Inventors: Wolfgang Ringel, Morlenbach; Peter Rutsch, Absteinach; Rolf Schneider, Weinheim; Edgar Kohl, Abtsteinach, all of Germany

[73] Assignee: Firma Carl Freudenberg, Weinheim an der Bergstrasse, Germany

[21] Appl. No.: 720,327

[22] Filed: Sept. 3, 1976

[30] Foreign Application Priority Data

Sept. 17, 1975 Germany .............................. 2541331

[51] Int. Cl.² ............................................. B01D 46/02
[52] U.S. Cl. ........................................ 55/381; 55/483; 55/500; 55/514; 55/521; 55/528; 210/493 R
[58] Field of Search ................. 55/378, 381, 379, 382, 55/483, 484, 497–499, 500, 521, 528, 514; 210/493, 497 R, 323 R, 323 T

[56] References Cited

U.S. PATENT DOCUMENTS

| 3,190,059 | 6/1965 | Bauder et al. ........................... 55/382 |
| 3,386,231 | 6/1968 | Nutting ................................... 55/484 |
| 3,422,602 | 1/1969 | Janson .................................... 55/378 |

FOREIGN PATENT DOCUMENTS 2,201,111   4/1974   France .................................. 55/379

Primary Examiner—Bernard Nozick
Attorney, Agent, or Firm—Burgess, Dinklage & Sprung

[57] ABSTRACT

A gas filter element comprising a holding frame and a plurality of self-supporting wedge-shaped filter pockets each having its wide end open and secured to said frame, each element comprising a pair of substantially symmetrical pocket halves secured to one another along the wedge edge and centrally along the opposite wedge end faces, and a plurality of laminar spacing elements with each pocket extending from adjacent the open end toward the wedge edge, each spacing element being secured to the opposite inclined wedge faces, each filter pocket being rendered self-supporting by the securing of the sub-elements to one another and the securing of the spacing elements to the pocket. Advantageously the filter pockets each comprises fusible fibers, the pocket halves being joined to one another by fusion and the spacing elements being secured to the pocket by fusion. The remaining wedge edges also may be stiffened by fusion and additional stiffening lines may be provided in each inclined wedge face extending from adjacent the open end toward the wedge edge.

9 Claims, 2 Drawing Figures

GAS FILTER ELEMENT

BACKGROUND

The invention relates to a gas filter element.

Such filters are used for the separation of floating particles from an air stream such as the air entering ventilating or air conditioning equipment or being recirculated thereby.

For the purpose of separating dust from an air stream it is known to use filter units containing as the filtering medium nonwoven mats of glass or textile fibers. It is advantageous for such nonwoven mats to be used in stiff supporting lattice designs known as high surface area filter units, in which the edges of the pieces of mat inserted in a V-shaped configuration are clamped to the holder in a dust-tight manner by appropriately shaped grids. A filter of this kind is described, for example, in German Petty Pat. No. 6,908,374. Due to the stiff mounting of the filter media, such high surface area filter designs have particularly good characteristics with regard to degree of dust separation, dust holding capacity and dust adhesion. Their use, however, is uneconomical inasmuch as the mountings are very expensive. Furthermore, the relatively great amount of time required for the replacement of the dust-filled pieces of matting with clean ones constitutes a disadvantage. Furthermore, in all such filter elements considerable difficulty is involved in making sure that the installed mat sections are joined together in a dust-free manner along the edges, for otherwise dust leaks can occur.

In recent times filter elements have become known which have an externally similar configuration while dispensing with stiff supporting structures.

For the manufacture of such a filter element from cut-to-shape pieces of glass fiber or textile fiber matting, such pieces have heretofore been assembled by sewing, cementing or spot welding to form the actual filter pockets. Various numbers of these filter pockets are joined removably or irremovably to a front mounting frame. The element is commonly used as a ready-assembled unit. Such filter elements have not, however, been widely used. The individual filter pockets balloon under operating conditions, resulting in irregular distribution of the flow on the active filter surfaces. Fluttering occurs, and this results not only in an unsatisfactory separation of dust particles but also the danger of damage to the filter pockets as well as the danger of contamination of the filtered air by the filter fibers. It has furthermore been found that the known outer stitching of the seams gathers the edges of the mats imperfectly, so that edge piping must be provided to protect them. In addition--especially in the case of fine and ultra-fine filter elements--the unavoidable holes created by the penetration of the needles have to be cemented shut by expensive hand operations.

To prevent the filter pockets of an element from touching one another when they balloon under operating conditions, thereby impairing their efficiency, a variety of methods has been used to restrain the ballooning action, but none of them has been entirely satisfactory. When the opposite sides of the filter pocket are joined directly to one another by tack stitching or continuous stitching, the areas where the sides are joined to one another are compressed together, and this reduces the effective filter area, even though each pocket is prevented from ballooning against the adjacent pocket. Furthermore, the flow of air into the pockets is reduced and the resistance of the element to the passage of air is increased.

Where the method of joining together the opposite sides of the filter pocket leaves space between the opposite seams, better conditions are achieved with regard to air flow, but there are other disadvantages: if the sides of the filter pocket are tied together spot-wise, any fluttering or vibrational movements between them will threaten to tear them away from each other at the points where they are attached. To prevent this, gores have been sewn between the sides of the filter pocket, i.e., triangular pieces of fabric are sewn between the sides of the filter pocket from the mouth to the bottom thereof, with the apex of the triangle at the bottom of the pocket. The disadvantage of this method of stitching is the great amount of time required for the sewing operation and for the subsequent gluing or sealing shut of the perforations made by the needle. Also, at the apex or bottom end of the pocket, there is a decided reduction of the active filter surface.

THE INVENTION

The invention is addressed to the problem of developing a pocket filter element which will equal the solid, high-surface-area filter as regards degree of dust removal and dust holding capacity while avoiding the disadvantages mentioned above.

This problem is solved in accordance with the invention by a gas filter element consisting of a holding frame 2 and a plurality of wedge-shaped filter pockets permanently attached to this frame, characterized in that the pockets have self-supporting properties in the air stream due to a trimmed, welded or fused seam joining together the parts of each pocket, plus spacing members made of flat material and attached by fusion in line with the direction of air flow, and, if desired, additional stiffening means affixed by fusion, the upstream edges of the pockets being affixed continuously and permanently to the holding frame which is of streamlined cross section, the holding frame consisting of hard foam material which is joined to the filter material of the pocket by foaming in place.

In a further development of the invention, the spacing members of the wedge-shaped filter pockets, which are attached to the pockets by welding or cementing, are made of a flexible sheet material and have additional stiffening means at the seams.

In still another development, the spacing members are made of sheet material formed into a tube of lozenge-shaped cross section, i.e. pyramidal or truncated pyramidal shapes; these tubes taper from the mouth to the end and are open or closed at their apex, and they do not reach all the way to the mouth of the pocket.

In another development, the pockets are provided with stiffening ribs additionally provided by welding.

Figure 2:
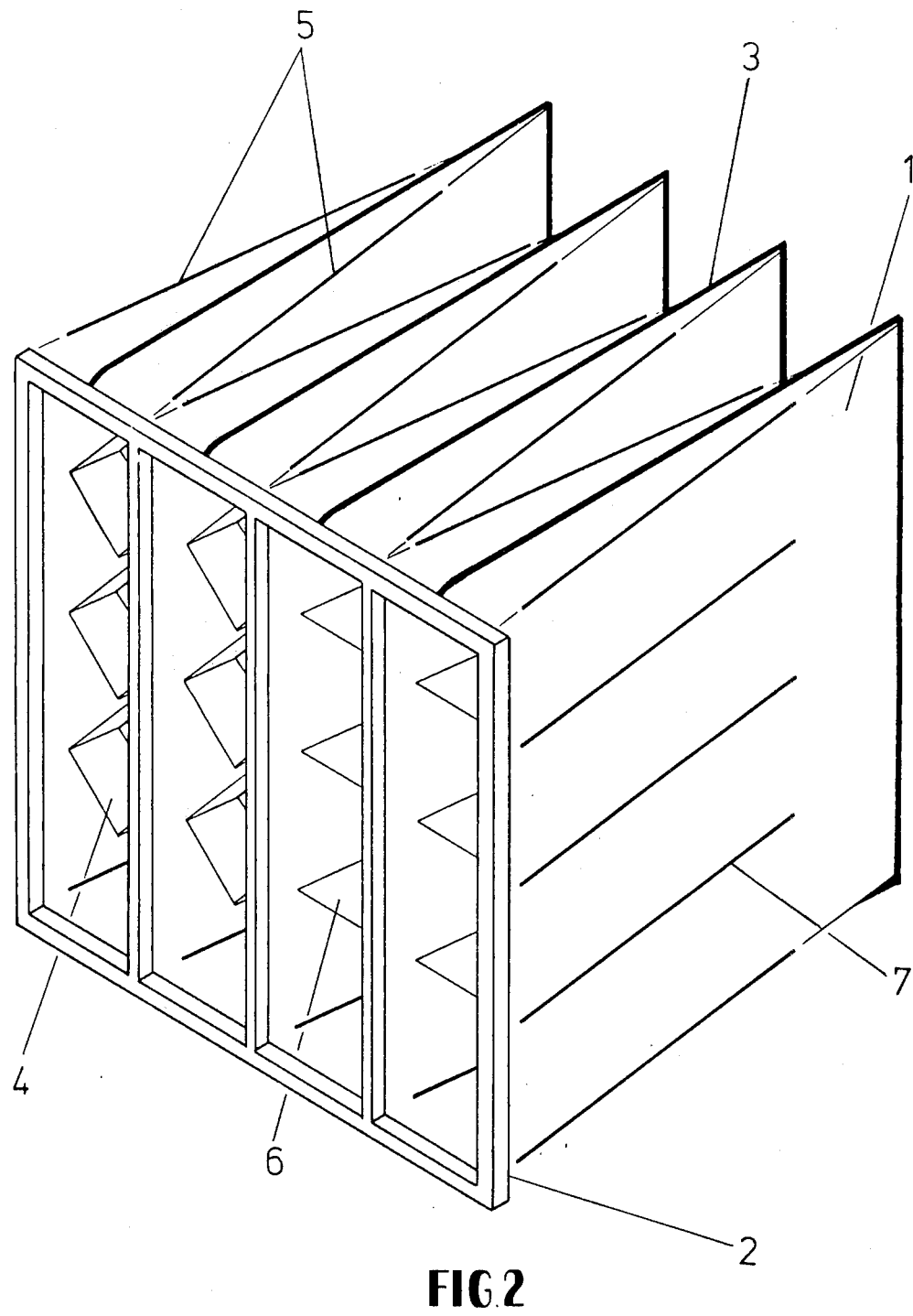

The invention will now be further described with reference to the accompanying drawings, wherein:

FIG. 1 is a perspective view of a filter pocket in accordance with the invention; and FIG. 2 is a perspective view of a filter element in accordance with the invention made up of two filter pockets as shown in FIG. 1, two slightly modified pockets and a holding frame for all four pockets.

Referring now more particularly to FIG. 1, the filter pocket is wedge-shaped and comprises a pair of substantially symmetrical pocket halves secured to one another as by fusion along the line 3. Each pocket half is formed of gas permeable filter material and, if the filter material has a preferential direction for placement in a gas stream, it is placed for the gas to flow from inside the pocket to the outside of the pocket.

For the achievement of further stiffening, and also to optimize conditions for the flow of air or gas into the interior of the pockets, a number of spacing members of lozenge-shaped cross section 4, made of nonwoven fabric, sheet material or woven fabric, varying in number according to the quality of the filter medium and its resistance to air flow, are cemented or welded in place at 7, and additional stiffening ribs 5 are provided by local welding of the filter medium. The use of bag-like inserts of lozenge-shaped cross section as spacing members has proven to be especially advantageous for the stabilization of the filter pockets against fluttering in the air stream. However, single flat spacing inserts 6 can also be used in accordance with the invention, as shown in FIG. 2.

As also seen in FIG. 2, a plurality of filter pockets are held together into a unit or element by a molded holding frame 2 which desirably is made of plastic foamed in place so as to embed the perimeters of the mouths of the pockets comprising the element.

The advantages achieved by the filter element of the invention consist especially in the fact that its use permits a quick replacement of the filter by untrained personnel, while providing assurance against dust leakage. The filter pockets have no tendency to flutter, and the performance of the filter element equals that of solid, high-surface-area filters as regards dust removal and accumulation.

The filter materials per se are known and desirably comprise non-woven fiber battings held together by bonding but not sufficiently stiff to be self-supporting. The fibers may comprise any normally employed, either continuous filaments or staple fibers and desirably, at least in part, they are fusible, i.e. can be caused to become adhesive by heat or application of a solvent, e.g. nylon, polyester, olefin, acrylic, acetate, and the like. If no fusible fibers are present then the requisite adhesion and stiffening can be effected by conventional adhesives, e.g. polyvinyl acetate latices, etc.

It will be appreciated that the instant specification and examples are set forth by way of illustration and not limitation, and that various modifications and changes may be made without departing from the spirit and scope of the present invention.

What is claimed is:

1. A gas filter element comprising a holding frame and at least one self-supporting wedge-shaped filter pocket each having its wide end open and secured to said frame, each filter pocket comprising a pair of substantially symmetrical pocket halves formed of fusible fibers and welded to one another along the wedge edge and centrally along the opposite wedge end faces and at least one laminar spacing element disposed within the pocket and extending from adjacent the open end toward the wedge edge, the spacing element being welded to the opposite inclined wedge faces, the filter pocket being rendered self-supporting by the welding of the pocket halves to one another and the welding of the spacing element to the pocket.

2. A filter element according to claim 1, including a plurality of spacing elements within each pocket, and spaced from the open mouth and the wedge edge.

3. A filter element according to claim 1, wherein the filter pocket comprises fusible fibers, the pocket halves being welded to one another by fusion and the spacing element being welded to the pocket by fusion.

4. A filter element according to claim 1, wherein the remaining wedge edges are also stiffened by fusion.

5. A filter element according to claim 1, wherein the spacing elements are flat in shape extending from one inclined wedge face to the other.

6. A filter element according to claim 1, wherein the spacing elements are pyramidal in shape and welded to the opposite inclined wedge faces along opposite longitudinal edges of the pyramid.

7. A filter element according to claim 1, including a plurality of additional stiffening lines in each inclined wedge face extending from adjacent the open end toward the wedge edge.

8. A filter element according to claim 1, including a plurality of filter pockets held in fixed position relative to one another by the single holding frame comprising a molded plastic mass in which the open end perimeters of the pockets are embedded.

9. A filter element according to claim 2, including a plurality of spacing elements within each pocket and spaced from the open mouth and the wedge edge, each filter element comprising fusible fibers, the pocket halves being welded to one another by fusion and the spacing elements being welded to the pockets by fusion, the remaining wedge edges also being stiffened by fusion, and each filter pocket further including a plurality of additional stiffening lines in each inclined wedge face extending from adjacent the open end toward the wedge edge, said additional stiffening lines coinciding with the fusion lines of the spacing elements to the pockets.

* * * * *

REEXAMINATION CERTIFICATE (623rd)
United States Patent [19]
Ringel et al.

[11] B1 4,056,375
[45] Certificate Issued Jan. 20, 1987

[54] GAS FILTER ELEMENT

[75] Inventors: Wolfgang Ringel, Morlenbach; Peter Rutsch, Absteinach; Rolf Schneider, Weinheim; Edgar Kohl, Abtsteinach, all of Fed. Rep. of Germany

[73] Assignee: Firma Carl Freudenberg, Weinheim an der Bergstrasse, Fed. Rep. of Germany

Reexamination Request:
No. 90/001,035, Jun. 19, 1986

Reexamination Certificate for:
Patent No.: 4,056,375
Issued: Nov. 1, 1977
Appl. No.: 720,327
Filed: Sep. 3, 1976

[30] Foreign Application Priority Data

Sep. 17, 1975 [DE] Fed. Rep. of Germany ....... 2541331

[51] Int. Cl.⁴ .................. B01D 46/02; B01D 29/10
[52] U.S. Cl. .................................. 55/381; 55/483; 55/500; 55/514; 55/521; 55/528; 210/493.1; 210/497.3
[58] Field of Search ............... 55/378, 379, 381, 382, 55/483, 484, 497–499, 500, 521, 514, 528; 210/493.1, 497.3, 323.1

[56] References Cited

U.S. PATENT DOCUMENTS

| | | |
|---|---|---|
| 1,363,753 | 12/1920 | Quinn . |
| 2,364,069 | 12/1944 | Hahn . |
| 2,569,243 | 9/1951 | Kovacs . |
| 2,853,154 | 9/1958 | Rivers . |
| 3,099,547 | 7/1963 | Hagendoorn . |
| 3,183,285 | 5/1965 | Boylan . |
| 3,190,059 | 6/1965 | Bauder . |
| 3,360,120 | 12/1967 | Getzkin . |
| 3,386,231 | 6/1968 | Nutting ................... 55/484 |
| 3,422,602 | 1/1969 | Janson ................... 55/484 |

FOREIGN PATENT DOCUMENTS

| | | |
|---|---|---|
| 599661 | 6/1960 | Canada . |
| 1700147 | 4/1924 | Fed. Rep. of Germany . |
| 1728676 | 11/1954 | Fed. Rep. of Germany . |
| 1731352 | 5/1956 | Fed. Rep. of Germany . |
| 1944619 | 8/1966 | Fed. Rep. of Germany . |
| 69083374 | 2/1969 | Fed. Rep. of Germany . |
| 1432013 | 10/1969 | Fed. Rep. of Germany . |
| 1607665 | 6/1970 | Fed. Rep. of Germany . |
| 7140425 | 10/1971 | Fed. Rep. of Germany . |
| 1407932 | 3/1972 | Fed. Rep. of Germany . |
| 2104675 | 8/1972 | Fed. Rep. of Germany . |
| 2137309 | 2/1973 | Fed. Rep. of Germany . |
| 2166432 | 1/1974 | Fed. Rep. of Germany . |
| 2343435 | 3/1975 | Fed. Rep. of Germany . |
| 1296701 | 5/1962 | France . |
| 1509054 | 12/1967 | France . |
| 806109 | 12/1958 | United Kingdom . |
| 1367226 | 9/1974 | United Kingdom . |

OTHER PUBLICATIONS

Product Bulletin Hi–Cap 90/35 and Hi Cap 80/25, Camfil GmbH (1978).

*Primary Examiner*—Bernard Nozick

[57] ABSTRACT

A gas filter element comprising a holding frame and a plurality of self-supporting wedge-shaped filter pockets each having its wide end open and secured to said frame, each element comprising a pair of substantially symmetrical pocket halves secured to one another along the wedge edge and centrally along the opposite wedge end faces, and a plurality of laminar spacing elements with each pocket extending from adjacent the open end toward the wedge edge, each spacing element being secured to the opposite inclined wedge faces, each filter pocket being rendered self-supporting by the securing of the sub-elements to one another and the securing of the spacing elements to the pocket. Advantageously the filter pockets each comprises fusible fibers, the pocket halves being joined to one another by fusion and the spacing elements being secured to the pocket by fusion. The remaining wedge edges also may be stiffened by fusion and additional stiffening lines may be provided in each inclined wedge face extending from adjacent the open end toward the wedge edge.

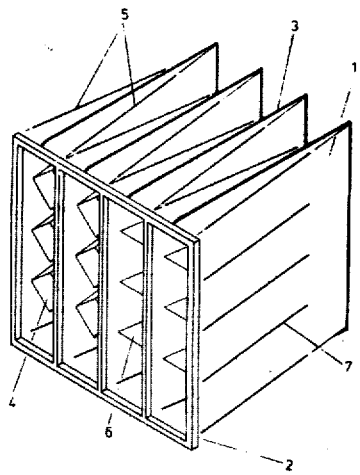

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-9 is confirmed.

* * * * *